United States Patent
Singer

(10) Patent No.: US 7,637,744 B2
(45) Date of Patent: Dec. 29, 2009

(54) ROTARY CONTACT CONNECTOR FOR ELECTRICAL CABLES

(75) Inventor: Stefan Singer, Gottmadingen (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/407,815

(22) Filed: Mar. 20, 2009

(65) Prior Publication Data

US 2009/0239391 A1 Sep. 24, 2009

(30) Foreign Application Priority Data

Mar. 22, 2008 (DE) .................. 10 2008 015 453

(51) Int. Cl.
*H01R 39/28* (2006.01)
(52) U.S. Cl. .......................... 439/17; 439/13
(58) Field of Classification Search ............. 439/13, 439/17

See application file for complete search history.

(56) References Cited

U.S. PATENT DOCUMENTS

| | | | |
|---|---|---|---|
| 2,422,961 A | | 6/1947 | Hallstrand |
| 2,502,252 A | | 3/1950 | Faile |
| 2,896,186 A | * | 7/1959 | Hardmark .................... 439/430 |
| 3,360,762 A | | 12/1967 | Mohr |
| 3,581,267 A | | 5/1971 | Schreffler |
| 4,894,014 A | | 1/1990 | Palus et al. |
| 5,853,294 A | * | 12/1998 | Rehder .......................... 439/17 |
| 6,227,895 B1 | * | 5/2001 | Mc Farlane ................. 439/352 |
| 6,608,422 B2 | * | 8/2003 | Bartman ....................... 439/17 |

FOREIGN PATENT DOCUMENTS

| | | |
|---|---|---|
| CH | 197966 A | 5/1938 |
| DE | 848378 C | 9/1952 |
| DE | 1209187 B | 1/1966 |
| DE | 1941309 A1 | 2/1970 |
| DE | 7140600 U | 12/1975 |
| DE | 3624474 A1 | 1/1988 |
| DE | 9012030 U1 | 11/1990 |
| GB | 423841 | 2/1935 |
| GB | 1117247 | 6/1968 |

OTHER PUBLICATIONS

German Search Report for DE102008015453.9 dated Jun. 13, 2008.

* cited by examiner

*Primary Examiner*—Briggitte R Hammond
(74) *Attorney, Agent, or Firm*—Lowe Hauptman Ham & Berner LLP

(57) ABSTRACT

A rotary contact-connection assembly for electric cables contains an electrically non-conducting support crossed by a borehole. A first bearing is configured in the borehole and a second bearing is configured radially outside the borehole around the support. The bearings are configured axially relative to each other and to the borehole. Both bearings are radially continuously electrically conducting. An electrically conducting plug is pluggable into an axial bearing passage aperture of the first bearing. A first electrical conductor of a first cable is fixable to an outer race of the first bearing. A second electrical conductor of the first cable is connectable to a hookup muff situated within the second bearing. A first electrical conductor of a second cable is passable through the borehole of the support and is connectable to the plug. A second electrical conductor of the second cable is connectable to an outer race of the second bearing.

10 Claims, 3 Drawing Sheets

ROTARY CONTACT CONNECTOR FOR ELECTRICAL CABLES

RELATED APPLICATIONS

The present application is based on, and claims priority from, German Application Number 102008015453.9, filed Mar. 22, 2008, the disclosure of which is hereby incorporated by reference herein in its entirety.

BACKGROUND

The disclosure relates to a rotary contact-connection assembly for electrical cables/cords.

The disclosure applies to all kinds of electrical cables, in particular those fed with 110, 220 or 380 volts. It relates especially to power hookup/extension cables of electrical tools such as saws, in particular pipe saws, pipe processing equipment, drill tools., right angle grinders, buffing machines etc., but also to household power extension cords used for instance with vacuum cleaners and kitchen gear such as stirrers.

There is a need is to improve the known rotary contact-connection assembly in a manner that at least one of the following advantages shall be secured: reduced friction, improved electrical conductivity, and/or slimmer size.

SUMMARY

Accordingly, one or more embodiments relates to a rotary contact-connection assembly for electrical cables/extension cords, hereafter "cables", which contains an electrically non-conducting support, at least two axially apart, mutually coaxial bearings mounted at the support, wherein a continuous borehole runs through the support axially with the bearings, from a first support end to a second support end;

a first of the two bearings is configured in a first end segment of the continuous borehole in a first support segment adjacent to the first support end and comprises an inner element in turn fitted with a continuous axial bearing passage;

enough free space is subtended about an outer race of the first bearing to assure sufficient room for a first conductor to allow it to be connected/connectable to said outer race;

an electrically conducting plug is used which can be inserted into the axial passage of the inner element of the first bearing and together with this inner element of the first bearing constituting an electrical plug-in connection and comprising a plug part to which a first electrical conductor of a second cable running from the second support end into said continuous borehole is connected/connectable;

at least one electrically conducting hookup muff is mounted on a second support segment which runs as far as the second support end, a second borehole end segment running through said second support segment and through which passes a second borehole end segment;

at least a second bearing comprises an internal element jointly with which it is configured on the minimum of one hookup muff, said inside element of the second bearing leaving clear a hookup muff portion to which may be connected or is connected a second electric conductor of the first cable;

enough free space is left about an outer race of the second bearing to leave enough room for the second electric conductor of the second cable to be connectable/connected to the outer race;

both bearings are continuously electrically conducting from their outer race to the inner element.

In some embodiments, an electric conductor of one of the two cables to be mutually connected is directly and axially configured in the bearing's center axis.

This feature allows a slimmer rotary contact-connection assembly. Also this assembly thereby may be designed with lower friction and improved connection conductivity. These advantages in particular may be attained when the bearings are needle bearings, especially needle bearing bushes devoid of an inner race.

DETAILED DESCRIPTION

Figure 1:
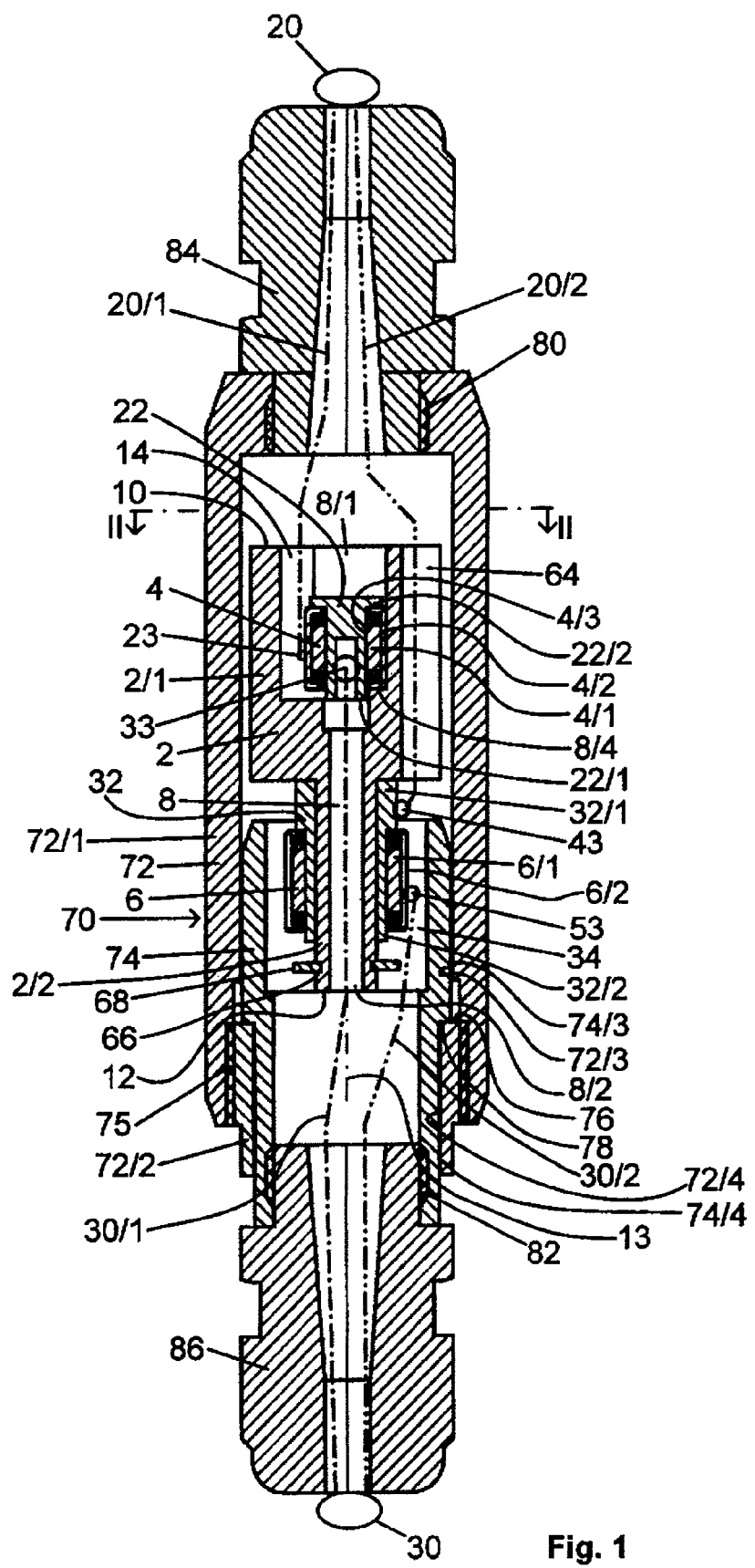
FIG. 1 is an axial section of an embodiment of a rotary contact-connection assembly for electrical cables.

The rotary contact-connection assembly of FIG. 1 contains a support or carrier 2 made either entirely or at least at its surfaces of an electrically insulating material, further a first bearing 4 and a second bearing 6, said bearings being radial (plain) bearings and being mounted in mutually coaxial manner while axially spaced from each other at the support 2.

A borehole 8 runs through the support 2 axially with respect to the two bearings 4 and 6 and from a first support end 10 to a second support end 12. The axes of rotation of the two bearings 4 and 6 and the longitudinal axis of the borehole 8 are axially configured along a straight center line 13. The support 2 is substantially smaller in the direction transverse to the center line 13 than in the longitudinal direction.

The first bearing 4 is configured in a first borehole segment 8/1 in a first support segment 2.1 next to the first support end 10. A bearing passage 4/3 runs axially through an inner element 4/1 (which in some embodiments comprises the inner race) of the first bearing 4. The first support segment 2/1 runs from the first support end 10 to a second support segment 2/2.

Enough free space 14 is left around an outer race 4/2 of the first bearing 4 to leave sufficient room for a first electric conductor 20/1 of a first cable 20 to be connected/connectable to said outer race, in some embodiments by soldering, as indicated in FIG. 1 by a first soldering spot 23.

An electrically conducting plug 22 can be inserted into the axial passage aperture 4/3 of the inner element 4/1 of the first bearing 4 and, together with this inner element, it constitutes an electrical power plug-in connection. The plug 22 comprises an element 22/1 to which a first electrical conductor 30/1 of a second cable 30 running from the second support end 12 into the borehole 8 is connectable/connected, in some embodiments by soldering, as schematically indicated in FIG. 1 by a second solder spot 33. In some embodiments, the plug 22 can be plugged in the direction from the first support end 10 toward the second support end 12 into the first bearing 4. The plug 22, in some embodiments, comprises an insertion-depth limiting collar 22/2 that may rest against the first bearing 4.

An electrically conducting, in some embodiments metallic, hookup muff 32 is slipped onto the second support segment 2/2 which runs as far as the second support end 12. A second end segment 8/2 of the continuous borehole 8 runs through the second support segment 2/2. The hookup muff 32 is mounted in freely rotating manner or, in some embodiments irrotationally, for instance at a slight press-fit, on the second support segment 2/2.

The outside diameter of the second support segment 2/2 and, in some embodiments also that of the hookup muff 32, is/are less than the outside diameter of the first support segment 2/2.

The second bearing 6 comprises an inner element 6/1 (which in some embodiments comprises the inner race) by means of which it is mounted on the hookup muff 32. The inner element 6/1 makes contact with the hookup muff 32 and thereby is connected electrically to it. The hookup muff 32 comprises a bush segment 32/1 to which a second electrical conductor 20/2 of the first cable 20 is connected/connectable, in some embodiments by soldering, as schematically indicated in FIG. 1 by a third solder spot 43.

The segment 32/1 of the hookup muff 32 receiving the electrical conductor 20/2 of the first cable 20, in some embodiments, is a segment which, in some embodiments, axially projects beyond the second bearing 6 and configured axially between said second bearing 6 and the first segment 2/1 of the support 2. This feature circumvents the need to configure the second electrical conductor 20/2 of the first cable 20 axially parallel above the bearing 6. The diameter of this bush segment 32/1, in some embodiments, is larger than that of the other bush segment 32/2 receiving the second bearing 6.

Enough free space 34 is provided around an outer race 6/2 of the second bearing 6 to leave room for a second electric conductor 30/2 of the second cable 30 to be connectable/connected to it, in some embodiments by soldering, as indicated schematically in FIG. 1 by a fourth solder spot 53.

The two bearings 4 and 6 are continuously electrically conducting from their respective outer races 4/2 and 6/2 to their inner elements 4/1 and 6/1, the individual parts making electrical contact with one another.

At least one of the two bearings 4 and/or 6, in some embodiments each, is, in some embodiments, a roller bearing. In a particular embodiment, the bearings 4 and 6 are needle bearings. In another particular embodiment mode, at least the first bearing 4, in some embodiments also the second bearing 6, shall be a needle bearing bush, the needles jointly with a needle cage constituting the inner element 4/1 of the first bearing 4 respectively the inner element 6/1 of the second bearing 6. Needle bearing bushes are needle bearings devoid of an inner race, comprising only a needle cage with needles and an outer race receiving said needle cage.

In the embodiment shown in the drawings, the two bearings 4 and 6 are needle bearing bushes, The needles of the first bearing 4 roll on the outer surface of the plug 22. The needles of the second bearing 6 roll on the outer surface of the hookup muff 32.

Not only do needle bearings in the form of a needle bearing bush without an inner race offer reduced friction, but they also allow a particularly slim rotary contact-connection assembly.

The hookup muff 32 may be mounted in freely rotatable manner, or in some embodiments irrotationally, on the support 2. Said hookup muff 32 may be omitted when the second bearing 6 comprises an inner race which, unlike the hookup muff 32 on the support 2, may be configured in freely rotatable manner, or in some embodiments irrotationally, and offers a hookup surface to which the second electrical conductor 20/2 of the first cable 20 may be affixed, in some embodiments by soldering, at a soldering site corresponding to the third solder spot 43.

The first bearing 4 can be inserted from the first support end 10 into the borehole 8. The plug 22 also can be inserted in the direction from the first support end 10 to the second support end 12, into the inner element 4/1 of the first bearing 4.

The outer race 4/2 of the first bearing 4 may be configured in freely rotatable manner in the borehole 8. However, in one or more embodiments, the outer race 4/2 of said first bearing is mounted irrotationally in the borehole 8, for instance being axially inserted into said borehole in a manner that said outer race shall be irrotationally kept in place in said borehole, illustratively by a loose press-fit or in other ways. In some embodiments, the first bearing 4 is situated in the first support segment 2/1 in a first borehole segment 8/1 of larger diameter, consequently allowing axially inserting the first bearing 4 into said borehole as far as a borehole offset 8/4.

Figure 2:
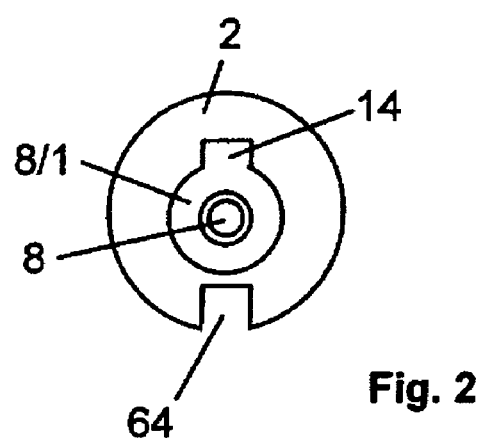
FIG. 2 shows the end face of a first bearing end of an electrically insulating bearing along the plane II-II of FIG. 1.
Figure 3:
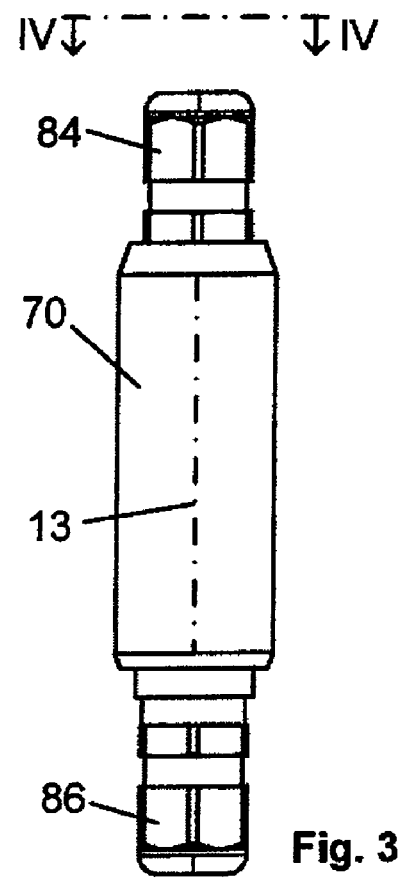
FIG. 3 is a reduced side view of the rotary contact-connection assembly.
Figure 4:
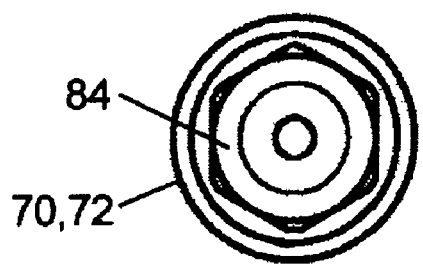
FIG. 4 is a schematic end face view of the rotary contact-connection assembly in the plane IV-IV of FIG. 3.

In some embodiments, the diameter of the first borehole segment 8/1 is larger than that of the second borehole 8/2. The free space 14 in the support 2 required to hook up the first electric conductor 20/1 to said outer race 4/2, in some embodiments, is subtended by an axially parallel inner longitudinal groove (or drilled hole) constituted in the end segment 8/1 of the borehole 8 and extending as shown by FIGS. 1 and 2 approximately as far as the inner end of the outer race 4/2 of the first bearing 4.

The second electric conductor 20/2 of the first cable 20 is able to run axially parallel to the center line 13 past the first support segment 2/1. In one or more embodiments, a longitudinal groove 64 (or drilled hole) opens at both ends and parallel to the center axis 13 is subtended in the outer surface of the support 2 along the first support segment 2/1 and allows passing the second electric conductor 20/2 of the first cable 20. This feature defines the end segment position of the second conductor 20/2 of the first cable 20. The free space 14 and the outer longitudinal groove 64, in some embodiments, each are radially spaced from the center line 13 and hence from the longitudinal axis of each bearing 4 and 6 and, in some embodiments, are configured being mutually diametrically opposite.

An outer surface groove 66 is constituted in the support 2 between the second support end 12 and the hookup muff 32 to receive a securing washer 68. When desired, a cupped washer may be mounted between the securing washer 68 and the hookup muff 32.

The support 2 and the two bearings 4 and 6 may be jointly configured in a two-part housing 70 of which the parts 72 and 74 are mutually rotatable about the center line 13 by means of slide bearing surfaces 72/3 and 72/4 respectively 74/3 and 74/4 fitted on them. Their axes of rotation coincide axially with the center line 13. Each housing part 72 and 74 may be integral as shown illustratively for the second part 74, or may be a dual element as indicated, regarding the first housing part 72, by the two elements 72/1 and 72/2 that are fitted with threads 75 allowing both irrotational connection and disengagement to/from each other.

The support 2 may be configured in non-affixed, i.e. loose manner, in the housing 70, for instance on the first housing part 72, in particular on latter's element 72/1.

The second housing element 72/2 of the first housing part 72 comprises an end face stop 76 which points in the same direction as the first support end 10 and which is axially opposite an axially pointing stop surface 78 of the second housing part 74 and in this manner axially positions the second housing part 74 in the first housing part 72.

The straight center line 13 defines a longitudinal axis which is axially aligned with a first cable feedthrough aperture 80 of the first housing part 72 and a cable feedthrough aperture 82 of the second housing part 74. The cable feedthrough aperture 80 of the first housing part 72 is configured axially opposite the first support end 10 and the second cable feedthrough aperture 82 is configured axially opposite the second support end 12 in the second housing part 74.

The two cable feedthrough apertures 80 and 82, in some embodiments, are fitted with a thread receiving respectively a first cable screw 84 and a second cable screw 86, said first screw clamping the first cable 20 and thereby affixing it in tension-relieving manner on the first housing part 72, whereas the second screw 86 affixes the second cable 30 and thus clamps it in tension-relieving manner on the second housing part 74. The cable screws 84 and 86 are known in the state of the art and therefore not further discussed herein.

The second housing part 74 axially projects into the first housing element 72/1 of the first housing part 72 and, in some embodiments, runs radially spaced apart and above the second bearing 6. The first housing element 72/1 of the first housing part 72 runs, in some embodiments, in the axial direction above the support 2 as a whole. The support 2 may be affixed to this first housing element 72/1 or be loose or clamped in/on it. The second housing element 72/2 of the first housing part 72 can be plugged on the outer end segment (the left segment in FIG. 1) of the second housing part 74.

The first housing part 72 with its two parts 72/1 and 72/2 forms a first sub-assembly jointly with the first cable screw 84, said sub-assembly together with the cable 20 clamped in said first screw 84 being rotatable relative to the second sub-assembly about the center line 13 as the axis of rotation, said second sub-assembly being constituted by the second housing part 74 and the second cable screw 86 clamping the second cable 30. Both sub-assemblies can be simultaneously rotated in opposite directions of rotation, or one sub-assembly may be stationary while the other is being rotated, or vice versa. Depending on the kind of rotation, either the first bearing 4 or the second bearing 6 shall be rotated, or both. The roller bearing friction is so low that said bearings may be rotated by means of the torques acting on the electric conductors of the cables 20 and 30. The needles of the inner element 4/1 of the first bearing 4 roll on the outer surface of the plug 22. The needles of the inner element 6/1 of the second bearing 6 roll on the outer surface of the hookup muff 32.

Figure 5:
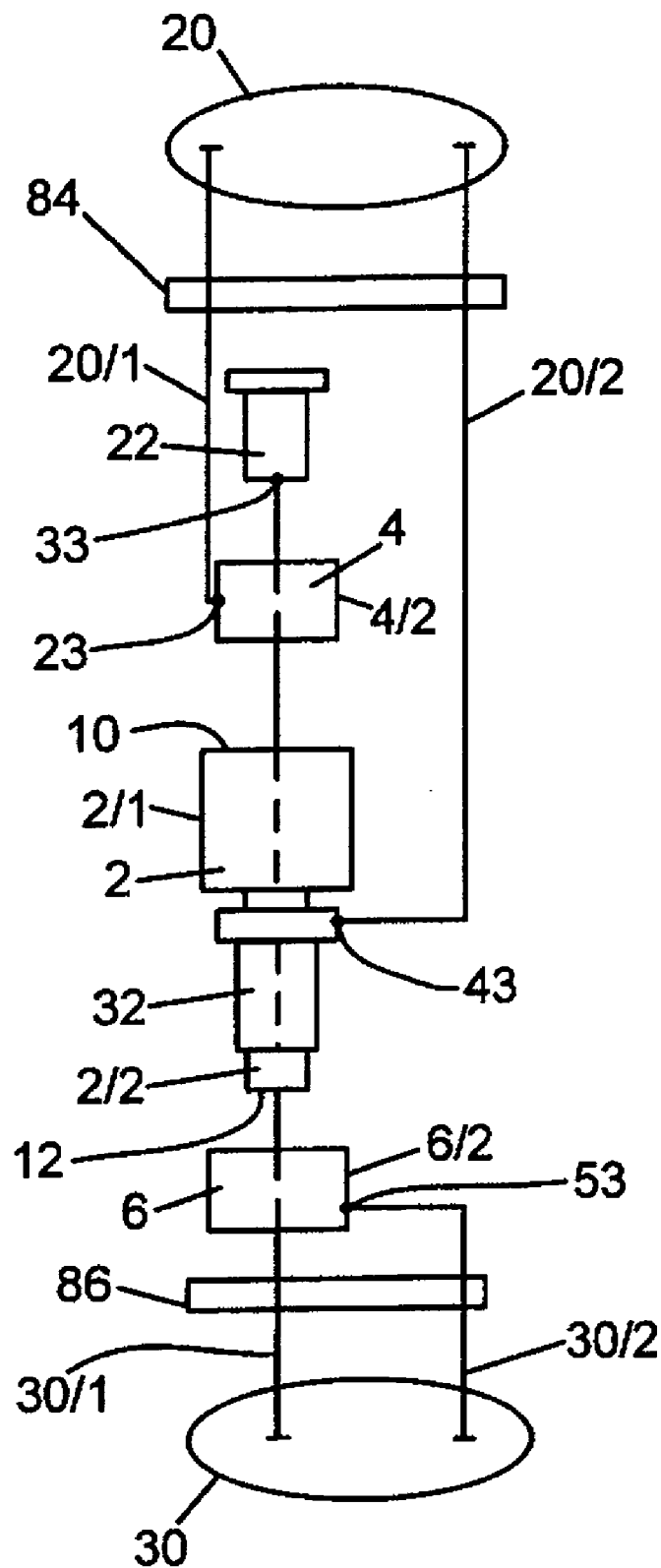
FIG. 5 is a schematic, exploded side view of the rotary contact-connection assembly.

FIG. 5 is an exploded view of the rotary contact-connection assembly of FIG. 1 shown in schematic side view devoid of the casing 70. The electrical conductors of the two cables 20 and 30 may be affixed by soldering, welding, screws or the like to the particular components of the rotary contact-connection assembly, for instance by an electrically conductive adhesive after the electrical conductors 20/1, 20/2 respectively 30/1 and 30/2 were made to pass through the cable screws 84 respectively 86 but before connecting the housing parts 72 and 74 to one another and the first bearing 4 and, in some embodiments, also the second bearing 6 have been plugged onto the support 2. Illustratively initially the first electrical conductor 30/1 of the second cable 30 may be made to pass completely from the second support end 12 through the borehole 8 so that, as shown in FIG. 5, it may project out of the first support end 10 and pass through the first bearing 4 and project from latter as far as the separate plug 22. In this manner said first electrical conductor 30/2 of the second cable 30 can be simply and easily affixed to the plug 22, for instance being soldered to it. Thereupon the first bearing 4 can be inserted from the first support end 10 into the borehole 8, for instance in press-fit manner. Next the plug 22 can be inserted, illustratively force-fitted into the bearing passage 4/3 of the inner element 4/2 of the first bearing 4. Alternatively however, initially the plug 22 may be inserted into the first bearing 4 before latter is inserted into the borehole 8 and thereafter said unit can be inserted into the borehole 8.

In some embodiments, the first electrical conductor 20/1 of the first cable 20 also is affixed by soldering or the like to the outer race 4/2 of the first bearing 4 before the first bearing 4 is inserted into the borehole 8 of the support 2.

Before or thereafter, the second electrical conductor 20/2 of the first cable 20 can be affixed for instance by soldering to the hookup muff 32. Before or after this just described step, the second electrical conductors 30/2 of the second cable 30 can be affixed to the outer race 6/2 of the second bearing 6, for instance by soldering, either before the second bearing is plugged snugly or at a press-fit onto the hookup muff 32, or thereafter.

Next the two parts 72 and 74 of the housing 70 are axially plugged into, and axially joined to, each other, by screwing the second housing element 72/2 into the housing element 72/1 of the first housing part 72.

Before or after joining the parts of the housing 70, the cable screws 84 and 86 are tightened to clamp the two cables 20 and 30, so they cannot be accidentally pulled out from said screws.

The electrical conductors 20/1, 20/2 and 30/1, 30/2 of the respective first and second cables 20 and 30 may be affixed at the solder sites 23, 33, 43 and/or 53 by other means than soldering, for instance by brazing/welding or bonding, for instance using an electrically conducting adhesive.

Two or more electrically conducting hookup muffs 32 may be configured axially apart and mutually electrically insulated on the second support segment 2/2 of the support 2, provided it be lengthened commensurately, each with another second bearing on it to allow affixing to them further electric conductors similar to the electric conductors 20/2 and 30/2.

The invention claimed is:

1. A rotary contact-connection assembly for electric cables, comprising an electrically non-conducting support;

at least two mutually coaxial bearings configured coaxially and axially apart at the support;

a continuous borehole that runs through the support axially relative to the bearings from a first support end to a second support end;

a first of the two bearings being configured in a first end segment of the borehole in a first support segment adjacent to the first support end and comprises an inner element in turn fitted with a continuous axial bearing passage aperture;

a first free space about an outer race of the first bearing to assure sufficient room for a first conductor of a first cable to be connectable to said outer race;

an electrically conducting plug insertable into the axial bearing passage aperture of the inner element of the first bearing and, together with the inner element of the first bearing, defining an electrical plug-in connection and comprising a plug part to which a first electrical conductor of a second cable running from the second support end into borehole is connectable;

at least one electrically conducting hookup muff mounted on a second support segment and runs as far as the second support end, a second borehole end segment of the borehole running through said second support segment, at least a second bearing of the bearings comprising an inner element jointly with which it is configured to the minimum of one hookup muff, said inside element of the second bearing leaving clear a hookup muff segment of said muff to which a second electric conductor of the first cable is insertable;

a second free space about an outer race of the second bearing to leave enough room for the second electric conductor of the second cable to be connectable to the outer race;

both said bearings are continuously electrically conducting from their outer races to the inner elements.

2. Rotary contact-connection assembly as claimed in claim 1, wherein at least one of said bearings comprises a roller bearing.

3. Rotary contact-connection assembly as claimed in claim 1, wherein at least one of the two bearings comprises a needle bearing.

4. Rotary contact-connection assembly as claimed in claim 3, wherein at least the first bearing is a needle bearing bush without an inner race, the needles jointly with a needle cage constituting the inner element.

5. Rotary contact-connection assembly as claimed in claim 1, wherein the hookup muff is mounted irrotationally on the support.

6. Rotary contact-connection assembly as claimed in claim 1, wherein the hookup muff is constituted by an inner race of the second bearing.

7. Rotary contact-connection assembly as claimed in claim 1, wherein the borehole in the first support segment comprises a first, enlarged-diameter, borehole end segment which runs from the first support end into the support and of which the diameter matches the outside diameter of the first bearing, said first bearing is insertable from the first support end into the first borehole segment, while the outer race of the first bearing constituting in the first borehole segment a plug-in connection with the first borehole segment.

8. Rotary contact-connection assembly as claimed claim 1, wherein the outer surface of the support comprises an open, longitudinal groove parallel to the borehole and open at both ends to receive an electrical conductor of the first cable.

9. Rotary contact -connection assembly as claimed claim 1, wherein the support is situated within a two-part housing, said parts being mutually rotatable about a longitudinal axis by means of slide bearing surfaces, said longitudinal axis being aligned with the center line of the borehole of the support and with two cable feedthrough apertures, the first of said apertures being configured axially opposite the first support end in a first of the two housing parts and the second said aperture being configured axially opposite the second support end in the second of the two housing parts.

10. Rotary contact-connection assembly as claimed claim 1, wherein the diameter of the second support segment is smaller than that of the first support segment.

* * * * *